June 1, 1954
D. W. BROOKFIELD
APPARATUS FOR MEASURING VISCOSITY
AND OTHER FLUID PROPERTIES
Filed Oct. 21, 1949
2,679,750
FIG. 1
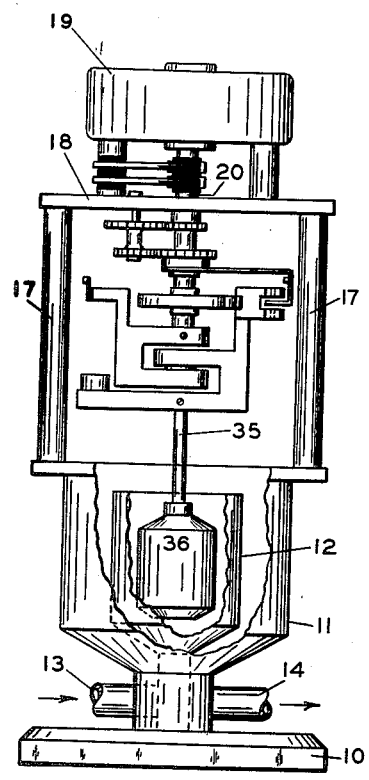
FIG. 2
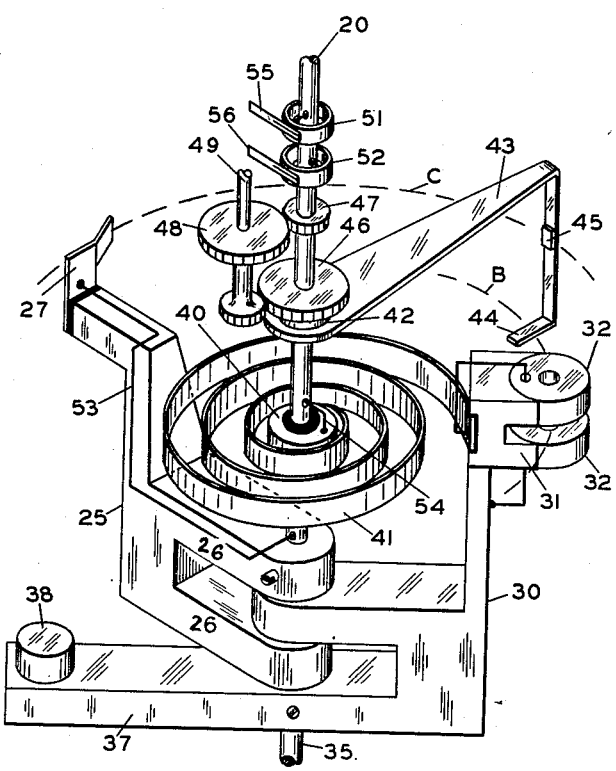
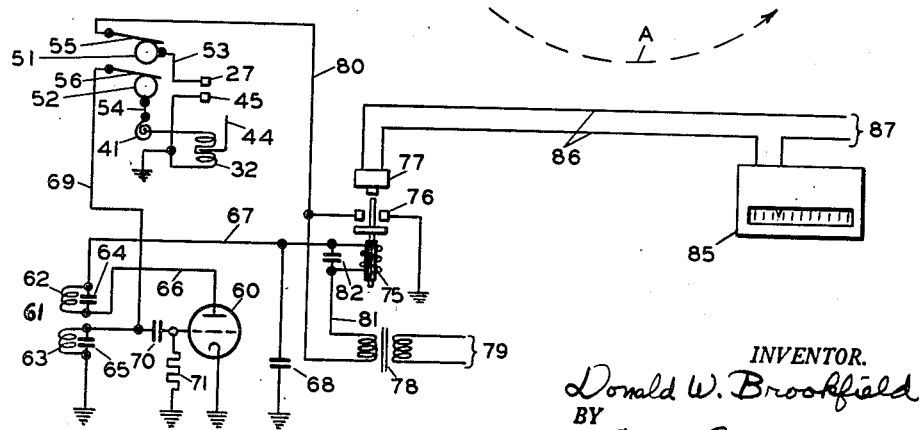
FIG. 3
INVENTOR.
Donald W. Brookfield
BY
E. C. Sanborn
Attorney Patented June 1, 1954

2,679,750

UNITED STATES PATENT OFFICE 2,679,750

APPARATUS FOR MEASURING VISCOSITY AND OTHER FLUID PROPERTIES

Donald W. Brookfield, Sharon, Mass., assignor to The Bristol Company, Waterbury, Conn., a corporation of Connecticut Application October 21, 1949, Serial No. 122,804

12 Claims. (Cl. 73—59)

This invention relates to apparatus for measuring the viscosity or other property of a fluid in accordance with the resistance to displacement of an element immersed therein. The invention provides expeditiously and efficiently for the continuous determination of such property and its exhibition either as an indication or a graphic record. Since, in its commercial embodiment, the invention has been developed particularly for the measurement of viscosity, it will be specifically described for purposes of illustration in connection with that fluid property, although it will be understood that its utility is not limited thereto.

Viscosity is defined as the resistance of a fluid to a force tending to change its form, because of the internal friction of one layer of the fluid against an adjacent layer. Or, it may be described as the force (stress) acting on a layer of the fluid required to produce a certain rate of flow (rate of shear). The C. G. S. unit of viscosity is known as the poise, which is defined as the absolute viscosity of a fluid that would require a shearing force of one dyne to move a square-centimeter area of either of two parallel layers of the fluid, one centimeter apart, with a velocity of one centimeter per second relative to the other layer, the space between the layers being filled with a fluid.

A feature of the invention comprises the provision of means whereby a continuous determination of viscosity may be made upon an open body of a liquid, either confined in a suitable container, or being circulated as a sample from a larger stream or body of a liquid in a process of treatment or control.

A further feature comprises means whereby to obtain a measure of viscosity upon the scale of a conventional instrument of the telemetering class, whereby an indication, record, or controlling function may be available at a point remotely located from that at which the actual viscosity determination is preferred.

The invention further provides in a viscosity meter of the class described such means as will effectively coordinate the optimum effective velocity of the viscosity sensing member with an optimum contact interval in an exhibiting instrument of the impulse-duration class.

In addition, the invention provides means whereby a measurement as above-described may be obtained without appreciable reaction upon, and consequent loss of accuracy of, the primary measuring element.

In carrying out the objects of the present invention it is proposed to provide a suitable sampling cup preferably adapted to the circulation of the liquid to be tested, and having suspended therein for continuous rotation about a vertical axis a cylindrical rotor coupled to a constant-speed drive shaft through a calibrated spiral spring, whereby the angular lag of the rotor with respect to the drive shaft will be a direct measure of the resistance of the liquid to movement of the rotor immersed therein. It is further proposed to provide electrical means in combination with said rotor and drive shaft whereby the angle of displacement between said rotating members may be continuously determined and rendered effective to produce a corresponding deflection upon the pointer of an indicating instrument or the pen of a graphic recorder.

The liquid in the sampling section can be considered to be in a great number of concentric layers between the rotor and the cup. The layer nearest the rotor is carried along at or near the rate of its moving surfaces, while succeeding layers toward the cup travel slower and slower, until the layer nearest the cup is stationary. Thus the rate of shear of the sample is the sum of the relative speeds of all these layers. Since rotor speed is constant and cross section (number of layers of fluid) between the rotor and the cup is constant, the rate of shear is constant. Thus, viscosity may be determined by determining the torque on the rotor creating this rate of shear.

Other features of the invention will be hereinafter described and claimed.

In the drawings:

Fig. 1 is a side elevation, partly in section, of a viscosimeter embodying the principles of the invention.

Fig. 2 is an isometric representation to a somewhat enlarged scale of a portion of the apparatus shown in Fig. 1.

Fig. 3 is a diagram showing the electrical connection of the apparatus.

Referring now to the drawings:

A mounting base 10 has fixed thereto a cylindrical vessel 11 adapted to serve as a receptacle for a quantity of the liquid whose viscosity is being tested. Supported within the vessel 11 is a smaller vessel or cup 12, open at the top and providing a chamber to contain a specific volume of said liquid. At the base of the vessel 11 are provided pipes or conduits 13 and 14, the former being connected to the lower part of the cup 12, and the latter to the lower part of the outer vessel 11, whereby a continuous stream of the liquid under test may be admitted through the pipe 13 and will pass upward into the vessel 12 filling it and overflowing into the larger vessel 11 whence it is carried away by the pipe 14.

Mounted above the vessel 11, as by ports 17, is a plate or equivalent member 18 carrying a constant-speed electric motor 19 having its shaft 20 disposed vertically, and coaxially with the chamber or cup 12. The motor 19 may, if desired, be provided with gearing, so that under operating conditions the shaft 20 will rotate at an optimum velocity presently to be set forth. The shaft 20 is preferably formed of hollow construction whereby to provide a conduit for certain insulated electrical conductors hereinafter to be described.

Carried by the lower extremity of the shaft 20 is a bracket or arm member 25 having two vertically spaced shackle portions 26, at least one of which is secured to the shaft 20 whereby said bracket member will rotate integrally with said shaft. The bracket member 25 carries upon a radial extension an insulated electric contact member 27, whose purpose and connection will presently be explained.

Journaled for rotation coaxially with the shaft 20, and pivotally supported by the bracket member 25 is a further bracket member 30 having a shackle portion interdigitated with those of the bracket member 25 to provide a hinge construction whereby the member 30 may rotate freely through a limited angle with respect to the member 25. The bracket member 30 carries a coil mounting 31 whereby to support a divided coil 32, the nature and purpose of which will hereinafter be explained. Extending downwardly from the bracket member 30 is a shaft or spindle 35 carrying on its lower extremity an enlarged cylindrical rotor 36 extending into the cup 12 to rotate freely with respect thereto and to be totally immersed in the liquid under test when the latter is maintained at such a level as to overflow the cup. Experience has shown that for certain viscosity ranges to which the principle of the invention is especially applicable, and with preferred dimensions of the operating parts, an optimum speed for the rotor 36 is of the order of 30 revolutions per minute; and, while there is no intention of so restricting the scope of the invention, this in the present instance will be taken as the operating velocity. It will be apparent that this or any other velocity may readily be established by the hereinbefore mentioned gearing associated with the motor 19.

The bracket or arm 30 carries a horizontal extension 37 having secured thereto a counterweight 38, whereby to balance the coil support 31 and to maintain in a state of equilibrium the assembly comprising the bracket 30 and parts carried thereby, and including the rotor 36, so that the latter will be freely rotatable about its axis without any tendency to gyrate or to assume an oblique position within the cup 12.

Mechanically fixed to the shaft 20 but electrically insulated therefrom is a hub 40 having attached thereto the inner end of a spiral spring 41 whose outer extremity is mechanically attached to the bracket member 30 or the coil support 31 as may be expedient, but electrically insulated therefrom. The spring 41 is so disposed that, with rotation of the shaft 20 in a counter-clockwise sense, as indicated by the arrow A in Fig. 2, the bracket 30 and parts carried thereby will tend to rotate with the shaft 20, but will be free for limited angular displacement relative thereto according to such retarding effect as may be offered in opposition to the influence of the spring 41.

Because intermittently actuated exhibiting means adapted for use in combination with the mechanical devices thus far set forth is more efficiently operable with impulses occurring at a frequency of the order of twelve per minute than at the optimum speed of 30 revolutions per minute characterizing the viscosity-responsive rotor 36, the following provision is made for coordinating an acceptable frequency of impulses with said optimum velocity.

Journaled upon the shaft 20 and free for rotation with respect thereto is a hub 42 carrying a radially extended arm 43 bearing an inwardly directed electrically conducting vane member 44 adapted to pass between the portions of the divided coil 32 carried upon the bracket 30. The arm 43 carries also a contact member 45 adapted to cooperate with the contact 27 on the bracket 25 in controlling an electric circuit when said contacts are mutually juxtaposed as presently to be set forth.

The hub 42 is provided with a gear member 46 and the shaft 20 with a pinion member 47, said gearing and said pinion being adapted to cooperate through the medium of an idler 48 journaled upon a post or stud 49 fixed to the mounting plate 18 to rotate the arm 43 in a horizontal plane about the common axis of the shaft 20 and the hub 42, and in the same direction as the rotation of said shaft. The combination of the gear 46, the pinion 47 and the idler 48 provides a speed reducing train, whereby the hub 42 and the arm 43 carried thereby will be rotated at a materially lower angular velocity than the shaft 20. As a specific example, the gearing may be so proportioned that, with the shaft 20 having a velocity of 30 revolutions per minute, the arm 43 will rotate about the axis of said shaft at a speed of 18 revolutions per minute.

The relative disposition of the several moving parts of the assembly as thus far described is such that, as the arm 43 rotates about the common axis of these parts, the vane 44, following the path B as generaly designated in Fig. 2, will pass into the field between the divided portions of the coil 32, whereby to modify the inductance thereof. Also, during the rotation of said arm 43, the contact element 45, following the path C in common with the contact 27, will be brought into momentary engagement therewith when said contacts occupy a common radial position about the axis of rotation.

Insulatedly carried upon the shaft 20 are two collector rings 51 and 52, the former being electrically connected to the contact member 27 by means of an insulated conductor 53 passing through the hollow shaft 20, the latter to the hub 40, and thus to the spiral spring 41 by means of a conductor 54 also passing through said hollow shaft. Insulatedly supported by the mounting plate 18 is a pair of brushes 55 and 56 engaging said collector rings 51 and 52, respectively, to provide electrical connection between moving and stationary parts of the electrical system. The frame, as well as un-insulated moving parts of the instrument, provides a "ground" connection common to a number of the conductors as will now be set forth.

An oscillatory circuit is made up of a triode 60 having a cathode, an anode and a control grid, in combination with an oscillation transformer 61. The oscillation transformer comprises a pair of magnetically linked coils 62 and 63, respectively shunted by capacitors 64 and 65.

One end of the parallel combination of coil 62 and capacitor 64 is connected by means of a conductor 66 to the plate or anode of triode 60, and the other end of said combination by means of a conductor 67 in series with a suitable capacitor 68 to ground. One end of the parallel combination of coil 63 and capacitor 65 is connected by means of a conductor 69 to the brush 56, and the other end of said combination directly to ground. The control grid of triode 60 is connected in series with a suitable capacitor 70 to conductor 69, and is also connected through a suitable grid-leak resistor 71 to ground. The cathode of the triode 60 is grounded.

A relay 75 is provided with a set of contacts 76 adapted to be closed by energization of the relay, and also with a switch 77 which may be of either the circuit-closing or circuit-opening class, according to the selection of associated equipment hereinafter to be set forth. A transformer 78 is adapted to have its primary winding energized from a suitable alternating-current source 79 and has one terminal of its secondary winding connected by means of a conductor 80 to the brush 55, and the other terminal of its secondary winding through a conductor 81 to one extremity of the actuating winding of relay 75. The other extremity of said winding is connected to the conductor 67; and a suitable bypass capacitor 82 in parallel with the winding serves to eliminate substantial alternating-current component therefrom. The contacts 76 of the relay 75 are connected between conductor 80 and ground.

An exhibiting instrument 85 is of the type which provides a deflection of a movable exhibiting member as a function of the durations of successive electrical impulses as cyclically impressed thereon through an electric circuit. A preferred form of such an instrument is set forth and described in United States Letters Patent No. 2,040,918, granted to C. W. Bristol, May 19, 1936. Subject to conditions forming no part of the present invention, such instruments may be either of a type adapted to provide a response proportional to intervals of application, or of a type responsive to intervals of interruption, of potential upon their responsive elements. An electric circuit 86, connected to the instrument 85, is adapted to apply thereto impulses of electric energy from a suitable source 87 through the switch 77, which will be of the circuit-closing, or circuit-opening class, according to which of said types characterizes the instrument 85. Thus, the reading obtained on said instrument will be subject to cyclic energization of the relay 75.

Before describing the operation of the apparatus as a whole, the performance of the electrical circuits will be explained. It will be seen that with the relay 75 deenergized and the contacts 27 and 45 separated, the secondary circuit of the transformer 78 will be incomplete, and no potential will be applied to the system. Upon the contacts 27 and 45 being brought into mutual engagement, one end of the transformer secondary is grounded, thus applying potential through the winding of the relay 75 and the conductor 67 upon the network comprising oscillation transformer 61 and the triode 60, whereby, according to well known principles of electronic circuits, to establish an oscillatory condition in said network. The capacitor 68, connected between conductor 67 and ground, provides a return circuit for current of oscillatory frequency. It will be observed that the divided coil 32 is connected through the spring 41, the collector ring 52, the brush 56, and the conductor 69 directly in parallel with the coil 63. The proportioning of these elements of the circuit is made such that the circuit will oscillate only when the coil 32 is "loaded" by the vane 44 being brought into the space between its two sections, and will cease to oscillate when said coil is free to function as an inductance in parallel with the coil 63. Thus, so long as the vane 44 is not immediately juxtaposed to the coil 32, the application of potential from the secondary winding of the transformer 78 will establish a non-oscillatory condition in the network, and the plate current of the triode 60 will flow through the conductors 66 and 67, dividing between the capacitor 82 and the winding of the relay 75 in parallel. Substantially all of the alternating component of this current will pass through the capacitor 82, while the unidirectional component will flow through the relay winding to energize the same, causing the contacts 76 to be closed. These contacts, it will be noted, are directly in parallel with that portion of the circuit which includes contact elements 27 and 45, whereby, upon energization of the relay 75, the latter contacts will be bridged by contacts 76, causing the relay to be locked in its energized position after separation of the contacts 27 and 45.

The above condition will be maintained so long as the circuit remains free of oscillation, which it will be until the vane 44 is brought into the space between the sections of the divided coil 32. When the coil 32 is loaded by the presence of the vane 44, a condition of oscillation will be set up; and the oscillatory current, flowing in the network including the capacitor 70 and the grid-leak resistor 71, will so affect the potential of the control grid in the triode 60 as to reduce the magnitude of the plate current to a value where the component flowing through the winding of the relay 75 is insufficient to maintain it in an energized state. Under this condition the contacts 76 will be opened, thus serving to interrupt the supply of current from the transformer to the network, and causing the circuit to revert to its original de-energized condition.

Operation of the apparatus, including both mechanical and electrical performance, will now be described. Upon the motor 19 being caused to operate in a manner to rotate the shaft 20 at a constant velocity in a direction indicated by the arrow A in Fig. 2, and at a rate of 30 revolutions per minute, the arm or bracket 25 attached to the lower end of said shaft will also rotate at that velocity, causing the insulated contact member 27 to be carried in a horizontal circular path generally indicated at C in Fig. 2. The arm or bracket member 30 pivotally supported upon the bracket 25, and mechanically attached to the shaft 20 by means of the spiral spring 41 and the hub 40, will also tend to rotate in the same direction as the bracket 25, and at the same angular velocity. The resilient characteristic of the spring 41 will, however, permit a certain angular displacement of the bracket 30 with respect to the bracket 25, and this displacement will be governed by such retardation or mechanical loading as may be applied to the shaft 35. The divided coil 32 borne by the bracket 30 will thus tend to follow a circular path in a horizontal plane as generally indicated by B in Fig. 2 and to rotate about the axis of the shaft 20 with the same angular velocity as the contact member 27 but displaced therefrom by a variable angle.

The arm 43 secured to the freely rotatable hub 42 and carrying the contact element 45 and the vane 44 will also rotate in a horizontal plane, said contact element following the path C whereby to coact with the contact element 27 in controlling an electric circuit, and the vane 44 following the path B whereby to coact with the divided coil member 32 in controlling an electronic circuit, as hereinbefore set forth. The connection of the hub 42 to the shaft 20 through the medium of the gear train including gear 46, pinion 47 and idler 48, causes the angular velocity of the arm 43 to differ from that of the bracket members 25 and 30, this velocity, as hereinbefore set forth, being selected to be 18 revolutions per minute. It will thus be seen that, with the mechanism operating as described, the contact members 27 and 45 will be periodically brought into engagement at a rate of 12 (30—18=12) revolutions per minute; or, in other words, these contact members will momentarily engage and separate at uniform intervals of five seconds. As the angular velocity of the bracket member 30 carrying the coil 32 along the path B is the same as that of the bracket member 25, it follows that the vane 44 will pass between the sections of the coil 32 also at intervals of five seconds. Since, however, the angular displacement between the brackets 30 and 25 is variable, it follows that a similar variation will characterize the time interval between coaction of the contact elements 27 and 45 and coaction between the vane 44 and coil 32. Thus, with the mechanism operating as described, and the electrical circuits energized from the transformer 79, the relay 75 will be periodically energized during the momentary engagement of the contact elements 27 and 45, and will remain energized until the vane 44 coacts with the coil 32, causing the relay to become deenergized. The switch 77 will accordingly be actuated in one sense during each of successive uniform time intervals of five seconds and in the opposite sense at intervening instants in said intervals, the durations of the successive periods of switch actuation being dependent upon the angular displacement between the rotating bracket members 30 and 25. The bracket 25 and the arm 43, carrying the coacting contact members 27 and 45 respectively, both being positively driven from the shaft 20, ample power is available to effect engagement and disengagement of said contacts without in any way influencing the operation of the related parts. The bracket 30, on the other hand, being resiliently driven through the spring 41, and subject to retardation by any physical force, cannot be utilized for the operation of mechanically coacting contacts. Reaction between the vane 44 and the coil 32, however, being attended by no appreciable mechanical torque, utilization of the electronic circuit for release of the relay 75 will have no effect on the position of the bracket 30 and parts carried thereby, and hence no influence upon the accuracy of measurement.

Under operating conditions the vessel 12 is filled with the fluid whose viscosity is to be determined. This is effectively accomplished by causing a stream of said fluid, diverted if desired from a relatively large body or stream of the same, to flow into the apparatus through the conduit 13, entering the chamber or sampling cup 12 at its lower portion, filling the same and overflowing the edges of the cup into the vessel 11, from whence it is drained by the conduit 13. The rotor 36 is thus immersed in a body of the liquid, the volume and depth of which are kept constant by virtue of its overflow into the vessel 11. As hereinbefore pointed out, the retarding effect of the liquid upon the movement of the rotor 36 is directly related to the viscosity of that liquid. The retarding effect is made manifest in a drag upon the rotor 36, resulting in a counter-torque whereby said rotor and the shaft 35 to which it is attached will resist the turning effort communicated thereto from the shaft 20. Motion being transmitted from said shaft to the rotor through the medium of the resilient spring 41, the latter will be yieldably deflected until it can deliver from the hub 40 to the bracket 30 a torque sufficient to overcome the counter-torque developed upon the rotor 36. The bracket 30 will accordingly tend to lag behind its normal angular position with respect to the bracket 25, and the degree of this displacement will be directly dependent upon the viscosity of the liquid under test. The durations of successive cyclic intervals of energization of the relay 75, being dependent upon the relative angular position of the rotating brackets 30 and 25, will therefore vary with the measured quantity. The instrument 85, being dependent for its reading upon the durations of successive cyclic impulses, and having its responsive circuit periodically energized through the switch 77 of the relay 75, will produce a reading which will be a measure of the viscosity of the liquid under test; and, if said instrument be so adjusted as to exhibit a zero reading under conditions where no counter-torque is developed upon the rotor 36, i. e., with the sampling cup 12 empty, the deflection of the index or recording pen of said instrument will become directly proportional to the viscosity of the liquid with which the cup is filled.

While the present invention has been set forth specifically in its utilization for the measurement of liquid viscosity, it will be apparent to those versed in the art that the principle is generally applicable to the determination of any fluid property which is quantitatively reflected as resistance to displacement of a suitably shaped rotor or impeller immersed in a body of that fluid. It may thus be employed not only in measurements on homogeneous fluids but on those carrying particles of other substances in suspension. Examples of properties which may thus be determined include consistency of liquid mixtures or of liquids carrying fibrous particles in suspension (as paper stock), density of slurries, and the degree of congealment of ice cream or the like.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for measuring a property of a liquid, comprising a member rotatable about an axis and adapted for immersion in a body of said liquid, a driving element rotatable at substantially constant speed about said axis, resilient yielding means operatively connecting said element to said member to drive the latter, a circuit for the transmission of electric signals, means for controlling said circuit comprising a first circuit-controlling element movable with said driving element, a second circuit-controlling element movable with said member, a third circuit-controlling element, and means for driving said third element at a speed different from that of the other circuit-controlling elements for causing said third element to coact sequentially with said first and second circuit-controlling elements to establish in said circuit electric signals in timed relationship depending upon the relative angular displacement of said first and second circuit-controlling elements.

2. Apparatus for measuring a property of a liquid, comprising a member rotatable about an axis and adapted for immersion in a body of said liquid, a driving element rotatable at substantially constant speed about said axis, resilient yielding means operatively connecting said element to said member to drive the latter, a circuit for the transmission of electric signals a circuit-controlling member connected to said circuit and carried by said driving element in a predetermined path at the velocity of said element, a circuit-controlling member connected to said circuit and carried by said rotatable member in a predetermined path at said velocity, but displaced from said first named circuit-controlling member by an angle corresponding to the displacement between said driving element and said rotatable member, and a member rotating about said axis at a constant velocity differing from that of said driving and rotatable members and carrying in both said paths circuit-controlling members adapted to coact with said first and second named circuit controlling members for defining signals in said circuit.

3. Apparatus for measuring a property of a liquid, comprising a member rotatable about an axis and adapted for immersion in a body of said liquid, a driving element rotatable at substantially constant speed about said axis, resilient yielding means operatively connecting said element to said member to drive the latter, electrical control elements movable with said member and said driving element respectively, and another electrical control element rotatable at a speed different from that of said rotatable member for cooperating with the first mentioned control elements to establish in each of uniform time cycles an electrical impulse representative of the angular displacement between said driving element and said rotatable member.

4. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact element movable with one of said members, an electronic control element movable with the other of said members, and means operable at substantially constant speed for cooperating with said contact element and said electronic control element to periodically establish electric signals of time durations commensurate with the angle of displacement between said members.

5. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple having one element movable with said driven member in a predetermined path and a cooperating element located in said path for coacting with the first named element of said couple during the movement of the latter, means for driving said cooperating contact member and said cooperating element of said control couple in unison at substantially constant speed, and connections controlled by said contact members and said couple elements for periodically producing electrical signals representative of the angle of displacement between said driving and driven members.

6. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple having one element movable with said driven member in a predetermined path and a cooperating element located in said path for coacting with the first named element of said couple during the movement of the latter, means for driving said cooperating contact member and said cooperating element of said control couple at a substantially constant speed lower than that of said driving and driven members, and connections controlled by said contact members and said couple elements for periodically producing electrical signals representative of the angle of displacement between said driving and driven members.

7. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member, a cooperating contact member engageable by the first named contact member during the movement thereof to define one end of each of a sequence of electric signals, and an electronic control couple having an element movable with said driven member and a cooperating element in the path of movement of said first named element of said couple to coact therewith in defining the other end of each of said signals, and means for operating said cooperating contact member and said cooperating control-couple element in unison.

8. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member, a cooperating contact member engageable by the first named contact member during the movement thereof to define one end of each of a sequence of electric signals, and an electronic control couple having an element movable with said driven member and a cooperating element in the path of movement of said first named element of said couple to coact therewith in defining the other end of each of said signals, and means for operating said cooperating contact member and said cooperating control-couple element at a speed below that of said driving and driven members.

9. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple comprising a coil element and a vane element adapted to cooperate therewith, one of said elements being movable with said driven member in a predetermined path and the other element being located in said path for coacting with the first named element of said couple during the movement of the latter, means for driving said cooperating contact member and said other element of said control couple in unison at substantially constant speed, an electronic circuit, and connections controlled by said contact members and said couple elements for controlling the condition of said circuit to periodically produce electrical signals representative of the angle of displacement between said driving and driven members.

10. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple comprising a coil element and a vane element adapted to cooperate therewith, one of said elements being movable with said driven member in a predetermined path and the other element being located in said path for coacting with the first named element of said couple during the movement of the latter, means for driving said cooperating contact member and said other element of said control couple at a substantially constant speed lower than that of said driving and driven members, an electronic circuit, and connections controlled by said contact members and said couple elements for controlling the condition of said circuit to periodically produce electrical signals representative of the angle of displacement between said driving and driven members.

11. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple comprising a coil element and a vane element adapted to cooperate therewith, one of said elements being movable with said driven member in a predetermined path and the other element being located in said path for coacting with the first named element of said couple during the movement of the latter, means for driving said cooperating contact member and said other element of said control couple in unison at substantially constant speed, an oscillatory electronic circuit, and connections controlled by said contact members and said couple elements for controlling the oscillatory condition of said circuit to periodically produce electrical signals representative of the angle of displacement between said driving and driven members.

12. Apparatus for measuring a property of a liquid, comprising a driving member rotatable about an axis at substantially constant speed, a driven member rotatable about said axis and adapted for immersion in said liquid, resilient yielding means operatively connecting said driven member to said driving member, a contact member movable with said driving member in a predetermined path, a cooperating contact member in said path engageable by the first named contact member during the movement of the latter, an electronic control couple comprising a coil element and a vane element adapted to cooperate therewith, one of said elements being movable with said driven member in a predetermined path and the other element being located in said path for coacting with the first named element of said couple during the movement of the latter, means for driving said cooperating contact member and said other element of said control couple at a substantially constant speed lower than that of said driving and driven members, an oscillatory electronic circuit, and connections controlled by said contact members and said couple elements for controlling the oscillatory condition of said circuit to periodically produce electrical signals representative of the angle of displacement between said driving and driven members.

References Cited in the file of this patent

UNITED STATES PATENTS

| Number | Name | Date |
|---|---|---|
| 1,067,995 | Lux | July 22, 1913 |
| 1,136,366 | Randall | Apr. 20, 1915 |
| 2,228,032 | MacGregor et al. | Jan. 7, 1941 |
| 2,519,378 | Kilpatrick | Aug. 22, 1950 |

FOREIGN PATENTS

| Number | Country | Date |
|---|---|---|
| 681,523 | France | Feb. 3, 1930 |
| 533,524 | Germany | Sept. 15, 1931 |